(12) United States Patent
Nerubenko

(10) Patent No.: US 7,438,165 B2
(45) Date of Patent: Oct. 21, 2008

(54) TORSIONAL VIBRATION DAMPER OF A ROTATING SHAFT

(76) Inventor: George Nerubenko, 5 Lisa Street, Suite 901, Brampton, Ontario (CA) L6T 4T4

( * ) Notice: Subject to any disclaimer, the term of this patent is extended or adjusted under 35 U.S.C. 154(b) by 0 days.

(21) Appl. No.: 11/290,641

(22) Filed: Dec. 1, 2005

(65) Prior Publication Data

US 2006/0081432 A1    Apr. 20, 2006

Related U.S. Application Data

(62) Division of application No. 10/801,969, filed on Mar. 16, 2004.

(51) Int. Cl.
*F16F 7/10* (2006.01)
(52) U.S. Cl. .................. 188/380; 74/574.2
(58) Field of Classification Search ........... 188/378, 188/379, 380; 267/188, 277, 281; 74/573 R, 74/5.5, 574.2; 464/180
See application file for complete search history.

(56) References Cited

U.S. PATENT DOCUMENTS

| | | | |
|---|---|---|---|
| 2,181,610 A | 11/1939 | Salomon | |
| 2,361,710 A | 10/1944 | Salomon | |
| 3,637,169 A * | 1/1972 | Tossman et al. | 244/170 |
| 5,493,936 A | 2/1996 | Stockmann et al. | |
| 5,495,925 A | 3/1996 | Enk | |
| 5,570,615 A | 11/1996 | Westphal et al. | |
| 5,720,248 A | 2/1998 | Crofts | |
| 5,733,218 A | 3/1998 | Sudau et al. | |
| 5,915,508 A | 6/1999 | Lai | |
| 5,934,424 A * | 8/1999 | Hosek et al. | 188/379 |
| 6,109,134 A | 8/2000 | Sudau | |
| 6,192,851 B1 | 2/2001 | Asahara et al. | |
| 6,217,475 B1 | 4/2001 | Shih | |
| 6,427,656 B1 | 8/2002 | Drecq et al. | |

FOREIGN PATENT DOCUMENTS

| | | |
|---|---|---|
| EP | 0 349 624 B1 | 12/1988 |
| JP | 05-321739 | 12/1993 |
| JP | 06-165698 | 7/1994 |
| JP | 10-018513 | 1/1998 |
| JP | 10-018523 | 1/1998 |
| JP | 11-323776 | 11/1999 |
| JP | 2001-057882 | 3/2001 |

OTHER PUBLICATIONS

Rebbert et al., FEV Motorentechnik GmbH: Powertrain Dynamics Applications Using "ADAMS/Engine Powered by FEV", Part II: Cranktrain Dynamics.

* cited by examiner

*Primary Examiner*—Pam Rodriguez
(74) *Attorney, Agent, or Firm*—David A. Ruston

(57) ABSTRACT

This invention is directed at torsional vibration dampers of a rotating shaft. The dampers of the invention provide self-tuning to dampen harmonics, over a broad range of shaft angular velocities. Where the shaft rotates with an angular velocity about a longitudinal axis, and rotates perpendicular to a plane of rotation, the damper comprises: at least one passive damping element, and one controlling damping element.

20 Claims, 10 Drawing Sheets

800

900

TORSIONAL VIBRATION DAMPER OF A ROTATING SHAFT

REFERENCE TO RELATED APPLICATIONS

This application is a division of U.S. application Ser. No. 10/801,969 filed Mar. 16, 2004, which claims priority under 35 USC 120.

FIELD OF THE INVENTION

The present invention relates generally to dampers for ameliorating torsional vibrations of a rotating shaft, and more particularly to self-tuning dampers.

BACKGROUND OF THE INVENTION

Eliminating torsional vibration in a rotating shaft is an important consideration in the transmission of energy. Many modern systems rely on a rotating shaft to deliver kinetic energy from a motor (e.g. combustion engines). Such a shaft is susceptible to torsional vibrations having a frequency of vibration that is a natural multiple of the shaft angular velocity. In many cases these vibrations arise in the motor, and are a result of periodic combustion procedures therein. These vibrations are undesirable due to associated noise and/or equipment fatigue.

One known solution to the vibration problem is the use of a dual mass flywheel. Such a flywheel acts as a pre-tuned resonant damper. However, a pre-tuned damper is not effective for dampening harmonics at variance with its resonant frequency. This is not optimal, especially for undesired harmonics having frequencies that vary with shaft angular velocity. Further, such a flywheel delays the response to the desired generalized force of rotation.

U.S. Pat. No. 6,217,475 Dual-Mass Variable Inertia Flywheel Assembly discloses a vehicle driveline system includes a planetary gear arrangement that cooperates with a flywheel member to provide a dual mass variable inertia flywheel assembly. The planetary gear arrangement preferably includes an automated actuator that selectively engages different portions of the planetary gear arrangement to provide at least two operating positions that each has an associated effective mass and a corresponding moment of inertia. Choosing an operating position selectively controls the inertia of the flywheel assembly and greatly reduces or eliminates torsion vibrations that may otherwise occur. The first and second operating positions also provide high and low range transmission operation, respectively. This solution, however, does not provide for a damper that is responsive to the varying shaft angular velocity.

U.S. Pat. No. 6,192,851 Vibration Reducing System For Internal Combustion Engine discloses a vibration reducing system of an internal combustion engine for an automotive vehicle. The vibration reducing system comprises a roll vibration system which generates a roll vibration of an engine main body, the roll vibration having a first vibration mode. Additionally, a rotational vibration system is provided to generate a rotational vibration having a second vibration mode, and includes a crankshaft of the engine, for generating a rotational driving force, a main flywheel fixedly connected to the crankshaft, a driving force transmitting mechanism through which the rotational driving force of the crankshaft is transmitted, the driving force transmitting mechanism being movably secured to the engine main body, and an inertial mass member drivably connected to the driving force transmitting mechanism and rotatable to generate an inertial force upon receiving the rotational driving force transmitted through the driving force transmitting mechanism. In the vibration reducing system, the first and second vibration modes cause anti-resonance at an anti-resonance frequency. Additionally, the rotational vibration system is adjusted to cause the anti-resonance frequency to be generally coincident with one of frequencies which are obtained respectively by multiplying an engine-revolution frequency at a predetermined engine speed by values each being represented by (a natural number/2). This solution is directed at countering engine vibration, not torsion vibration of the shaft.

U.S. Pat. No. 5,733,218 Flywheel Having Two Centrifugal Masses And A Torsional Vibration Damper With Gear Train Elements Which Can Be Adjusted As A Function Of Load discloses a torsional vibration damper has an input-side transmission element and an output-side transmission element, at least one of which is connected, preferably by means of a spring device, with at least one moment-transmitting element of a gear train which acts between the two transmission elements. At least one of the moment-transmitting gear train elements can be aligned before the creation of a connection to the corresponding element with some play, or clearance, at least in the radial direction, with respect to this element carrier, and after the application to the gear train of an adjustment moment which effects an alignment of this transmission element with respect to the other transmission elements as a function of the force by moving the two transmission elements into a predetermined relative position, the gear train element in question can be provided with a connection to the element carrier which fixes the element in its position where it has been aligned as a function of the force. This disclosure also fails to address dampers that are responsive to the varying shaft angular velocity.

U.S. Pat. No. 5,720,248 (EP 586 973 B1) Torsional Tunable Coupling For Diesel Engine Drive Shaft discloses an improved coupling assembly is provided for transmitting rotary power from the working end of an internal combustion engine to a driven shaft. The crankshaft also has a free end connected to an accessory drive train. The coupling assembly comprises a low inertia flywheel having a mass so selected as to cause the node of the first crankshaft mode of torsional vibration to be located in the vicinity of the middle of the crankshaft, and a flexible coupling which interconnects the working end of the crankshaft with the driven shaft. The low inertia flywheel not only reduces the amplitude of the torsional deflection at the free end of the crankshaft, but further raises the primary torsional vibration orders of the engine which excite the coupling assembly by at least one half of an order such that the peak stresses applied to the teeth of the first gear wheel of the accessory drive train are at least halved and are further applied to at least twice as many gear teeth, thereby greatly prolonging the life of the gear wheel. Moreover, the low inertia flywheel further increases the lifetime of the flexible coupling by raising its natural frequency to a level which is substantially higher than the 0.5 engine order of torsional vibration associated with engine malfunction and governor interaction. This disclosure does not address dampers that are responsive to the varying shaft angular velocity.

U.S. Pat. No. 5,570,615 Arrangement For Balancing Varying Moments And Vibrations In A Motor Vehicle Drive Train discloses technology to balance varying moments and reduce vibrations in the drive train of a motor vehicle. Three flywheel masses and a clutch are provided in a common housing. Two flywheel masses are connected by springs to provide a dual-mass flywheel for reducing vibrations which can be transmitted into the transmission from the crankshaft and the third flywheel mass is connected to the first flywheel mass by planet gears mounted in fixed relation to the housing so that the direction of rotation of the third flywheel mass is opposite to the direction of rotation of the crankshaft. This disclosure is also directed at a pre-tuned solution, not at a responsive, self-tuning solution.

U.S. Pat. No. 5,493,936 Two-Mass Flywheel discloses a two-mass flywheel including a device that in series with a slip friction clutch couples a secondary mass rotationally-elastically to a primary mass. The slip friction clutch includes two side disks, similar to cup springs, that engage opposite faces of a center disk at the same effective diameter. The two side disks are preassembled to make a subassembly in which the spring preload can be adjusted after assembly. This is another pre-tuned solution.

EP 349 624 Device For Suppressing Noise And Vibrations, In Particular In Continuously Variable Transmissions With Powers Split In Motor Vehicles discloses a device for suppressing noise and vibration in continuously variable transmissions with power split in motor vehicles. The power is split into two branches, one of which passes through a continuously variable converter. Said converter is insulated from the whole housing by means of special noise- and vibration-suppressing elements. The noise-producing torsional vibrations of the converter unit are also reduced to a minimum by a multi-weight flywheel system. This solution does not propose to overcome the aforementioned limitations of a pre-tuned multi-mass damper.

Application JP 2001057882 Vibration Damping Flywheel With Double Mass In Automobile discloses a vibration damping flywheel with a double mass in an automobile capable of buffering shock of output torque of an engine and damping twisted vibration of a driving system by means of the double mass. The vibration damping flywheel with the double mass in the automobile comprises a flywheel with a primary mass and a secondary mass, a compressed coil spring, in which two sets of the compressed coil springs respectively located in an inner side and outer side are filled up by grease, for improving damping effect in order to improve buckling prevention and durable strength, a drive plate capable of flexibly realizing a hysteresis curve of the spring by compressing the coil spring while rolling on the compressed coil spring and by adjusting the shapes by means of an ax-shaped die or arch-shaped die, a roller for compressing while the drive plate is rotating itself and also rolling on the spring, and a spring guide capable of supporting a compression type coil spring. This application does not address the issue of pre-tuning deficiencies.

Applications JP 10018523 and JP 10018513 Device Having Buffer Device Laid Between At Least Two Flywheel Mass Bodies Capable Of Relatively Turning For Each Other disclose making the turning resistance of a buffer device variable for the number of revolutions or a centrifugal force, and installing a pressure accumulator effective in a peripheral direction and a pressure accumulator effective in an axial direction. Pre-tuning limitations are also inherent in this technology.

Application JP10018523 discloses a flywheel wherein the axis of abscissa relates to a turning angle across the flywheel mass bodies, while the axis of ordinate shows the transmissible moment of an elastic torsional vibration damping device and a transmissible moment via a slide clutch relates to the centrifugal force of a friction means. The coil spring of the damping device is somewhat compressed, due to the relative turning motion of the flywheel mass bodies from the non-acting position thereof. Moment generated continues until becoming equal to the slide moment of a friction means. Then, this friction means slips to a turning angle, due to turning in the same direction. When the means slips, exceeding the angle, the spring is further compressed, and a block is formed after the passage of the means through a turning angle range. Furthermore, when moment exceeds a value transmissible via the friction means, the flywheel mass bodies become capable of giving a relative turning motion. As a result, the variation of the moment can be dampened or eliminated. This technology is not applicable to problem of per-tuning.

In application JP10018513, an intermediate plate of the output part of a friction slide clutch forms the input part of a buffer device, and the buffer device has a first disc and a second disc at both sides of the intermediate plate. The first and second discs are connected to a rotary mass body at an axial gap in such a state as incapable of turning. Also, a pressure accumulation member made of a coil spring is housed in the windows of the zone of the intermediate plate, and the coil spring acts against the relative rotation of the intermediate plate, and the first and second discs. In addition, a friction device is laid between first and second rotary mass bodies in parallel with the spring, and at a position between the first disc and the zone of the first rotary mass body in an axial direction. Thereafter, the friction device is set and tightened between the disc and a crimp ring, and a friction ring is laid between the crimp ring and the zone in an axial direction. Also, the crimp ring is peripherally fixed to the first disc. According to this construction, a vibration can be dampened. This technology is also inapplicable to the problem at hand.

Application JP 06165698 Crankshaft Device For Two-Cylinder Four-Cycle Engine, is directed to reduce energy loss even in the case that massive error occurs at balance weights when a crankshaft alone is balanced, by easily adjusting the massive error afterward, and reducing the mass of a second balance weight. A fan driving pulley and a flywheel are fixed to a crankshaft in which a crank angle of 180 degrees are shown between a first crank pin and a second crank pin. A first balance weight which suppresses a vibration moment of the crank shaft is arranged on a crank arm on one end side of the crankshaft. A second balance weight is arranged on a flywheel fixed to the other end side of the crankshaft. This flywheel technology is not addressed to overcome pre-tuning limitations.

Patent JP 2588838 Belt-Type Continuously Variable Transmission is directed to improve vibration reducing performance of a flywheel and durability of its supporting part by variably forming inertia mass of the flywheel in a belt type continuously variable transmission. A drive pulley, provided in a drive shaft connected to an engine through a flywheel, can be connected to the drive shaft through a forward clutch. When a shift range is placed in a stop range with small inertia mass only required for the flywheel, the forward clutch is disengaged. When the shift range is placed in a running range with large inertia mass required for the flywheel, the forward clutch is engaged, and inertia mass in a full line part in the drawing is used to serve as the substantial inertia mass of the flywheel. This technology is also not applicable to overcome pre-tuning limitations.

U.S. Pat. No. 6,427,656, Internal Combustion Engine Including A Means Of Reducing Cyclic Disturbances For Low-Speed Running discloses an invention related to an internal combustion engine, the crankshaft of which is equipped with a pulley or flywheel secured to it by fastening means, in which the flywheel is equipped with at least one pendular element, whose size, mass and position on the flywheel are determined so as to be tuned to close to the angular frequency of the major harmonic of the cyclic disturbance.

This technology does address a self-tuning solution. However, the pendulum solutions incorporated therein (Flyweights, Liquid mixtures, etc.) do not comprehensively address all acceleration patterns. Also, the disclosed unattached flyweights or liquid mixtures may not be compatible with other design considerations e.g. engine noise, environmental concerns, etc. Further, the solution disclosed addresses self-tuning multi-mass flywheels for single harmonic annihilation only.

Japanese application 11323776, Rolling Vibration Reducer For Internal Combustion Engine, discloses a rolling vibration reducer for an internal combustion engine. The reducer offers a rolling vibration reducing effect in specified operating conditions even if the inertial mass of a main flywheel system is changed. A rotor portion of a compressor for an air-conditioner, constituting a main flywheel system, is connected to a compressor pulley rotationally driven by an accessory driving belt via an electromagnetic clutch in an approachable/separable manner. A rotating shaft of the rotor portion is connected to the electromagnetic clutch and provided with a torsional spring portion of which spring constant is operated along the direction of the torsion of the rotating shaft. In this way, in rotationally driving the rotor portion, with the operation of the spring constant of the torsional spring portion, the antiresonant frequencies of the vibration of the main flywheel system and the vibration of a sub-flywheel are kept to approximately agree with any of the frequency natural number/2 times of a rotational frequency at the preset rotating speed of a crank shaft. Although this application demonstrates the incorporation of an electromagnetic clutch, it only addresses preset shaft speeds.

Thus, it is not known in the art to provide a damper for shaft torsional vibrations capable of dampening multiple frequencies that are a function of the shaft angular velocity. Nor is it known to similarly dampen single frequencies, except by pendular free flyweights and liquid mixtures. Ideally, the response delay, to the desired generalized force of rotation, of an improved damper is less than that of a dual mass flywheel.

SUMMARY OF THE INVENTION

The prior art catalogued above fails to provide for multi-harmonic self-tuning. It also fails to provide an alternative to free flyweights or liquid mixtures for single-harmonic self-tuning. Neither does the prior art address electromagetic solutions, except for preset shaft velocities.

It is, thus, an object of an aspect of the invention to provide new self-tuning dampers for shafts rotatable over a broad variable range of angular velocities.

Further it is an object of an aspect of the invention to provide self-tuning dampers for shafts rotatable over a broad variable range of angular velocities, wherein the dampers respond to multiple harmonic frequencies of the angular velocity.

According to one aspect of the present invention there is provided a damper for mitigating torsional vibrations of a shaft, rotating with an angular velocity about a longitudinal axis, and rotating perpendicular to a plane of rotation, said damper comprising:

at least one passive damping element, and
one controlling damping element.

According to another aspect of the present invention there is provided a damper for ameliorating torsional vibrations of a shaft, rotating with an angular velocity, said damper comprising:

a spring having a spring constant of proportionality with respect to motion in a first degree of freedom, a mass coupled to said spring for oscillation along said first degree of freedom, wherein said oscillation dampens said torsional vibrations of said shaft corresponding to a frequency of said oscillation, a selector coupled to said spring for movement along said spring in a second degree of freedom, said movement under governance of said angular velocity of said shaft, such that said spring constant of said spring, for said oscillation, is selected.

According to yet another aspect of the present invention there is provided a damper for reducing torsional vibrations of a shaft, rotating about a longitudinal axis, and perpendicular to a plane of rotation, said damper comprising:

a joint, displaced from said longitudinal axis, and in said plane, a pendulum having a degree of freedom for pendulum motion, about said joint, said motion in said plane, such that said pendulum motion dampens said torsional vibrations corresponding to the frequency of said pendulum motion.

According to one aspect of the present invention there is provided a damper for reducing torsional vibrations of a rotating shaft, said damper comprising:

a first spring,
a second spring,
a mass physically coupled to said first spring and electromagnetically coupled to said second spring for oscillation of a frequency, wherein said oscillation dampens said torsional vibrations of said shaft that correspond to said frequency, accelerometers coupled to the mass and the shaft for detecting the relative motion of said mass and said shaft, a current generator for adjusting an electromagnetic bond whereby the second spring is coupled to the mass, a computer coupled to said accelerometers and said current generator for detecting at least one undesired said torsional vibration, determining a corresponding dampening spring stiffness improvement, and signaling current generator to adjust current in order to implement said improvement.

According to still another aspect of the present invention there is provided a method for damping torsional vibrations of a rotating shaft wherein said shaft includes a hub, a mass physically coupled to said hub via a first spring and coupled to said hub via a second spring and electromagnetic bond, said method comprising:

(i) Oscillating said mass angularly with respect to said hub in a manner that absorbs energy with a resonance related to the total effective spring constants of the first and second springs, (ii) identifying undesired harmonic motion, in said mass relative to said hub, (iii) calculating applied current changes that, when applied by a current generator to said electromagnetic bond, change the total effective spring constant, and improve dampening of the detected undesired harmonic motion, and (iv) Applying said current changes.

According to still yet another aspect of the present invention there is provided a damper for mitigating torsional vibrations of a shaft, rotating with an angular velocity, said damper comprising:

a spring having a spring constant of proportionality with respect to motion in a first degree of freedom, a mass coupled to said spring for (i) oscillation along said first degree of freedom, wherein said oscillation dampens said torsional vibrations of said shaft corresponding to a frequency of said oscillation, and (ii) movement along said spring in a second degree of freedom, said movement under governance of said angular velocity of said shaft, such that said spring constant of said spring, for said oscillation, is selected.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
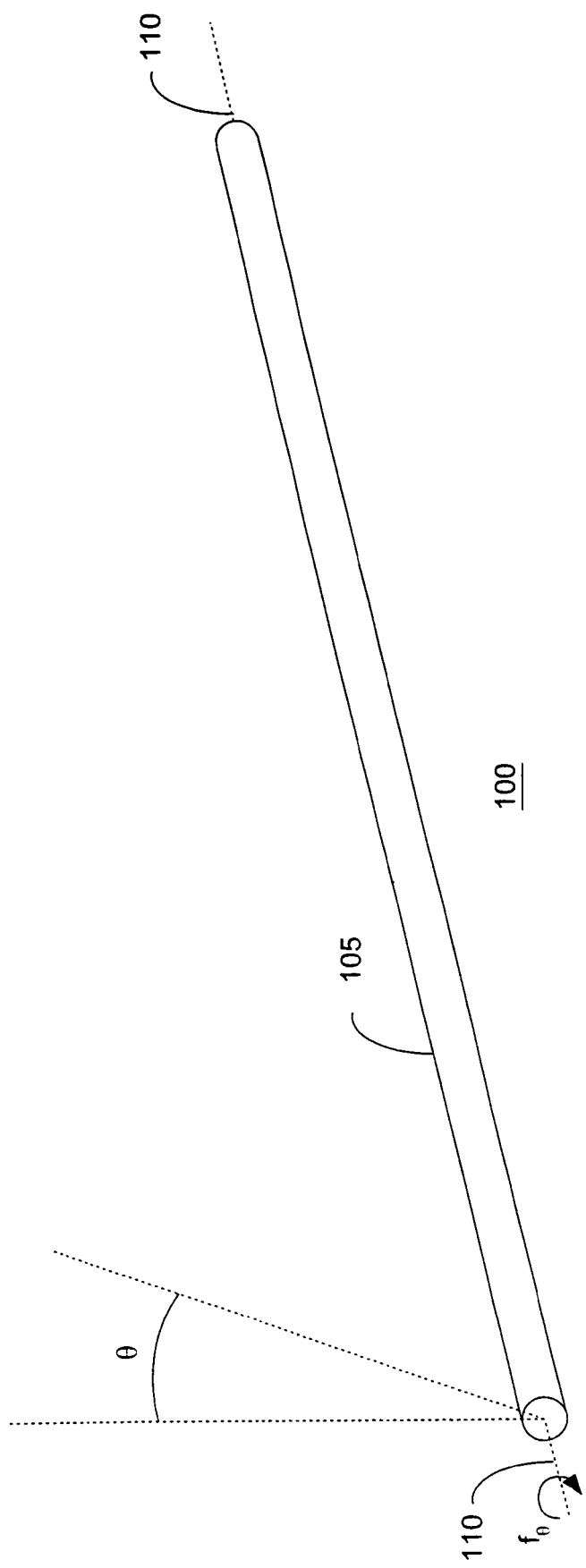
FIG. 1 shows a perspective representation of a rotating shaft upon which a damper according to the present invention may be implemented.

Referring to FIG. 1, a shaft 105 rotates, with angular movement displacement $\theta$ and angular velocity $$v = \frac{\partial}{\partial t}\theta,$$

about its primary axis 110, forced by the general force $f_\theta$ of moment about axis 110, according to the prior art.

In conventional applications, the shaft 105 is incorporated in a motor, generator, engine, engine transmission, etc. In such applications, the shaft 105 is subjected to harmonic irregularities in the otherwise smooth delivery of force $f_\theta$ to the shaft. Thus, the generalized force $f_\theta$ of moment about axis 110 is a composite of desired force $f_{\theta D}$ and irregular force $f_{\theta I}$, comprising one or more undesired harmonic generalized forces, or $$f_\theta = f_{\theta D} + f_{\theta I} \quad (1)$$

where $$f_{\theta I} = \sum_{n=1}^{\infty} \Gamma_n \quad (2)$$

and $\Gamma_n$ is a periodic function having a period T related to angular velocity by $$v = 2\pi n/T \quad (3)$$

These irregular force harmonics result from the device (e.g. combustion engine) applying the force $f_\theta$ as it undergoes periodical procedures (combustion phases, valve operation, etc.). Of particular concern are the first modes of irregular force harmonics (e.g. n=1, 2, 3, 4, 5, 6, 7, 8), which are, typically, the only harmonics large enough to cause concern.

Figure 2:
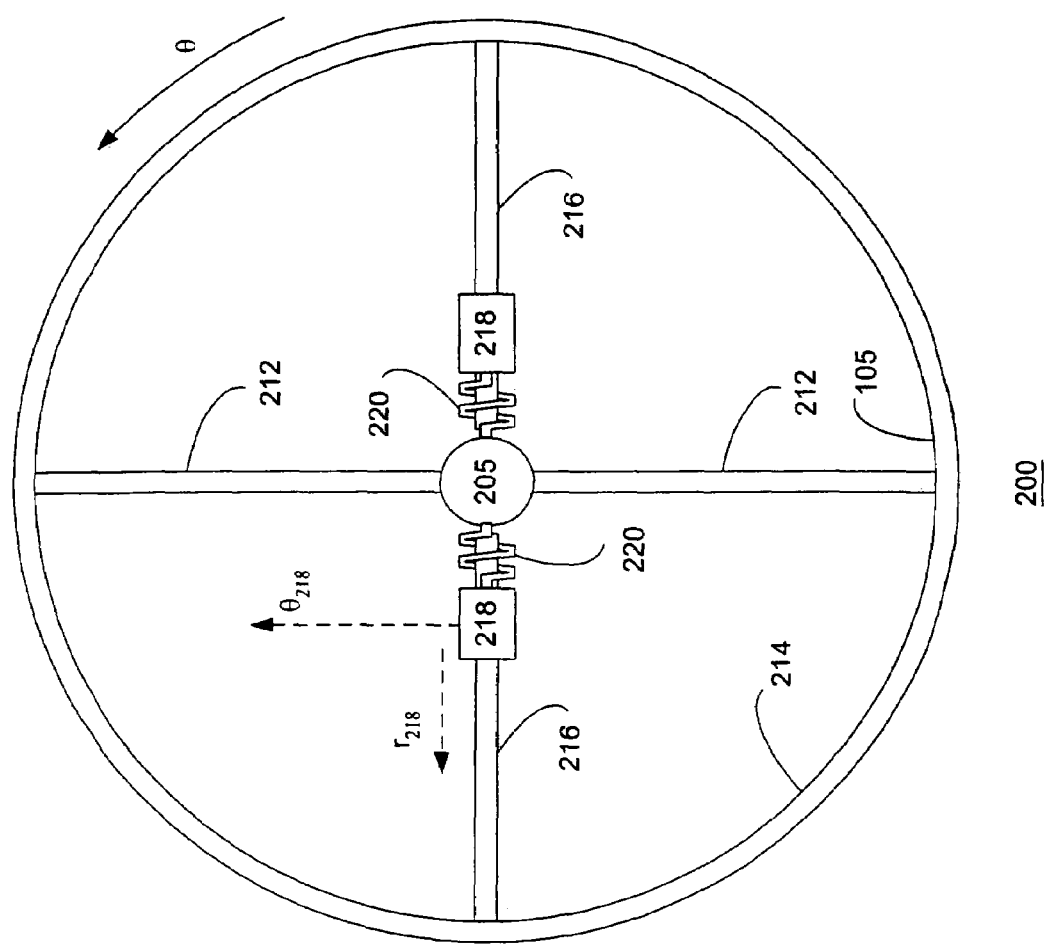
FIG. 2 shows an end view of the shaft of FIG. 1 with one embodiment of the invention.

In FIG. 2, there is shown, a damper 200, according to a first embodiment of the invention. The damper 200 addresses one of the undesired harmonic generalized forces $f_{\theta I}$. Hub 205 corresponds to the shaft 105 of FIG. 1, and is therefore shown integral herewith, but may be mounted thereon. The hub is connected to ring 214 via cantilever springs 212. Cantilever springs 216 are, likewise to springs 212, connected to ring 214, but are free at the near hub end. Masses 218 are mounted freely on springs 216 and coupled to the hub 205 by springs 220. Alternatively (not shown), springs 220 may couple masses 218 to ring 214 only, or to both ring 214 and hub 205. Masses 218 are free to move along springs 216 (represented as $r_{218}$), except for the counter-forces due to the compression or extension of helical springs 220. Further, masses 218 are free to move perpendicular to the radius (represented as $\theta_{218}$), except for the counter-forces due to displacement of springs 216. The entire apparatus 200 is symmetrical, in order to ensure the moment of inertia is centered about hub 205. The maximum radial displacement of masses 218 is $r_{218-max}$; The displacement of masses 218 in equilibrium position (v=0, springs 220 undistorted) is $r_{218-0}$.

Where $m_{218}$ is the mass of mass 218, and $k_{220}$ is the spring constant of spring 220, the deviation of mass 218 from equilibrium position is $$r_{218} = r_{218-0} m_{218} v^2 / K_{220} \quad (4)$$

As the radial position of the mass 218 is extended, the length of cantilever spring 216 for providing bending beam resistance is effectively shortened. The shortening of the beam, in turn, implies a greater perpendicular force, for a perpendicular displacement i.e. as the length of the bending beam is shortened, the spring constant of proportionality relating displacement to force $k_{216}$ increases. These effects, the outward displacement of masses 218 under angular velocity and the corresponding increase of the spring constant of proportionality $k_{216}$ as the masses 218 move outward, combined with select dimensioning of the spring 216, result in a proportional relationship of $$K_{216} = 3EJ/\{L^3[1-(3r_{218}/2L)+(r_{218}^3/2L^3)]\}@K_{216}/m_{218} = v^2 \quad (5)$$

over the operating range of v. In these equations, E represents Young's Modulus, J represents the cross-section effectiveness of the cantilever and L represents the initial length of cantilever spring 216. In other words, masses 218 act as selectors for choosing $k_{216}$ in accordance with v. Thus, the equilibrium radial motion of masses 218 will have a consequence regarding the angular motion of masses 218. Thus the radial motion of mass 218 has the effect of governing factors affecting the angular simple harmonic oscillator motion of mass 218. The masses 218, in oscillating along $\theta_{218}$, function as a tuned mass damping flywheel, where the spring characteristic $k_{216}$ varies according to $(nv)^2$. This effectively dampens the torsion due to one irregular force harmonic.

The essence of this embodiment is:

(i) a spring (spring 216), (ii) a mass (mass 218) coupled to the spring and oscillating in a first degree of freedom ($\theta_{218}$), and (iii) a selector (also, in this embodiment, mass 218) moving in a second degree of freedom ($r_{218}$) along the spring, under the governance of the shaft angular velocity v and, moving in a manner that determines the force-displacement proportionality constant of the spring mentioned in (i) as that spring relates to the oscillating mass in (ii).

In other terms: As angular velocity v increases and the position of mass 218 relocates to periphery, and there is a corresponding increase in the moment of inertia of the spring 216—mass 218 system coupled together with re-adjusting and re-tuning in accordance to equilibrium (5). This phenomenon contributes to better damping characteristics of system.

Figure 3:
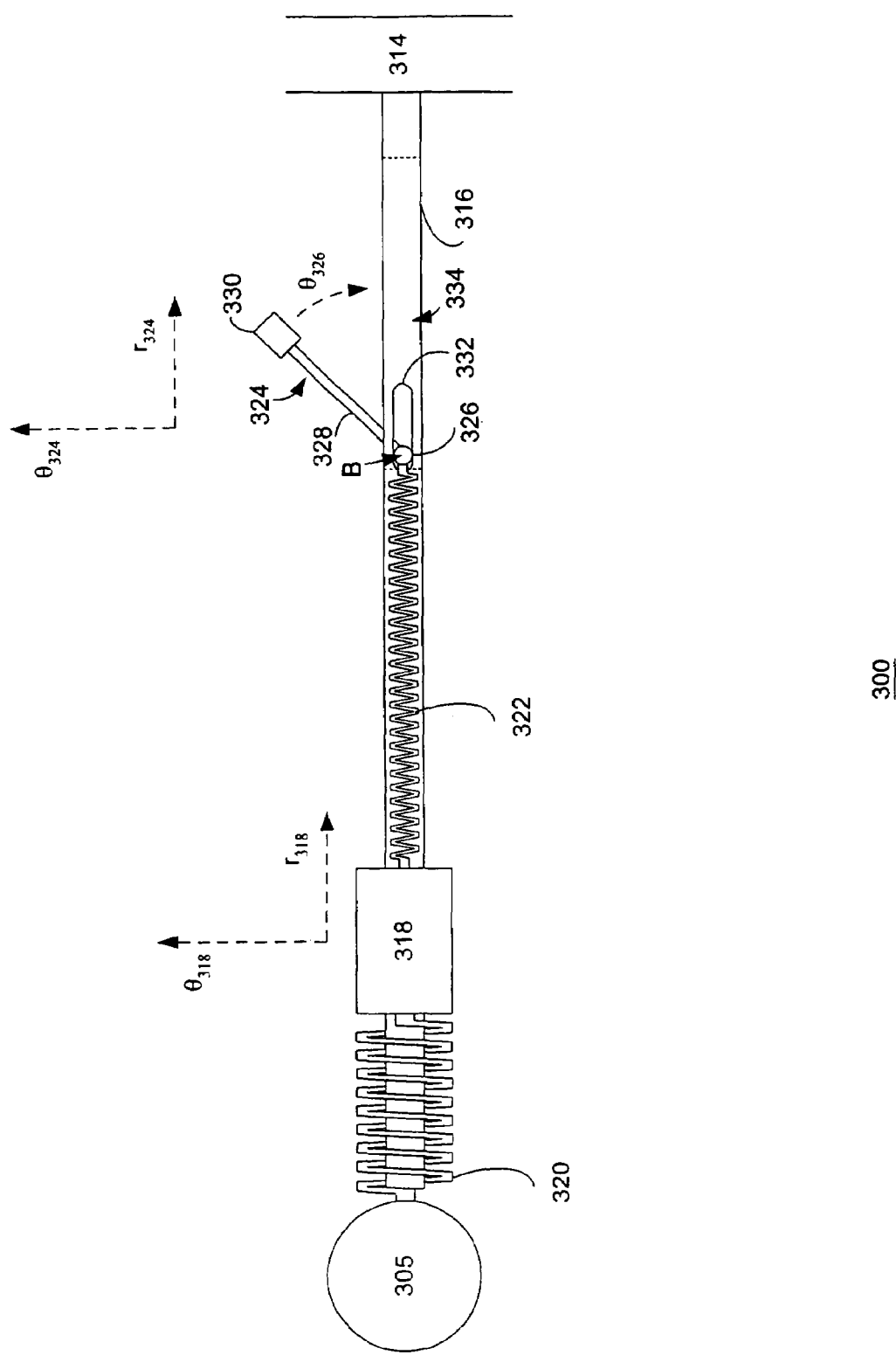
FIG. 3 shows a partial end view of the shaft of FIG. 1 with springs and masses according to an alternative embodiment of the invention.

Referring to FIG. 3, one spring 316, of another embodiment 300, is shown, similar to spring 216 of FIG. 2, for addressing three of the undesired harmonic generalized forces $f_{\theta f}$. In this arrangement 300, the hub 305, connecting ring 314, springs 320, and 316, and mass 318 are as discussed with reference to FIG. 2, having regard to the hub 205, connecting ring 214, springs 220, and 216, and mass 218, respectively.

One arrangement 300 is shown in FIG. 3 for simplicity, although another identical arrangement 300 is necessary on the opposite side of hub 305 as per the symmetry shown in FIG. 2. In addition to features in common with the first embodiment 200, an additional helical spring 322 connects mass 318 to mass 324. Mass 324 is mounted in a channel (slot) 332 of spring 316, and includes three distinct components: a guide-joint 326, connected to a pendulum mass 330 by a stretching springing rod 328. Spring 316 also incorporates a pass through gap 334 (transverse to FIG. 3) so that pendulum mass 330 is free to rotate about the guide-joint 326 without striking the spring 316. Masses 318 and 324 are free to move in the same manner as masses 218 of FIG. 2 i.e. they are capable of a radial and angular motion ($r_{318}, \theta_{318}$) ($r_{324}, \theta_{324}$). Mass 318 is governed by inertial rotational force proportional to $v^2$, given proper selection criteria as noted above. As with masses 218, mass 324 is influenced by the angular velocity of the shaft v, and the force due to helical spring 322. Provided the dimensions of the spring 316 are properly selected, the effective spring constant of spring 316 at the location (B) of mass 324 is proportional in the same manner as for the case of spring 216 in the previous embodiment. Assuming dimensions are chosen such that the same harmonic is not compensated, mass 318 and 324, and their symmetrical counterparts dampen two of the irregular force harmonics.

A third irregular force harmonic is nullified by the pendulum oscillation of mass 324. Mass 324 undergoes pendulum motion about joint 326, which is displaced from the center of hub 305. Under rotation of the hub 305 by v, mass 324, viewed from the rotating frame of reference, is subject to an apparent centrifugal force $$F_{pendulum} = m_{324}(v)^2 r_{324} \quad (6)$$

For oscillation of a pendulum through a small displacement under a constant force (a reasonable approximation given the small oscillation displacement relative to the radius corresponding to angular motion $\theta$) the pendulum's own period of oscillations is $$T_{326} = 2p(I_{328}/g)^{0.5} \quad (7)$$

(approximating the location of the pendulum center of mass).), where g is acceleration of free fall (g=9.81 m/s$^2$), and $I_{328}$ is (assuming that $r_{328}$ is elongating, stretching of flexible rod 328 under additional inertia force created by irregularities)

$$I_{328} = k_r(I_{328\text{-}0} + r_{328}) \quad (8)$$

Figure 4:
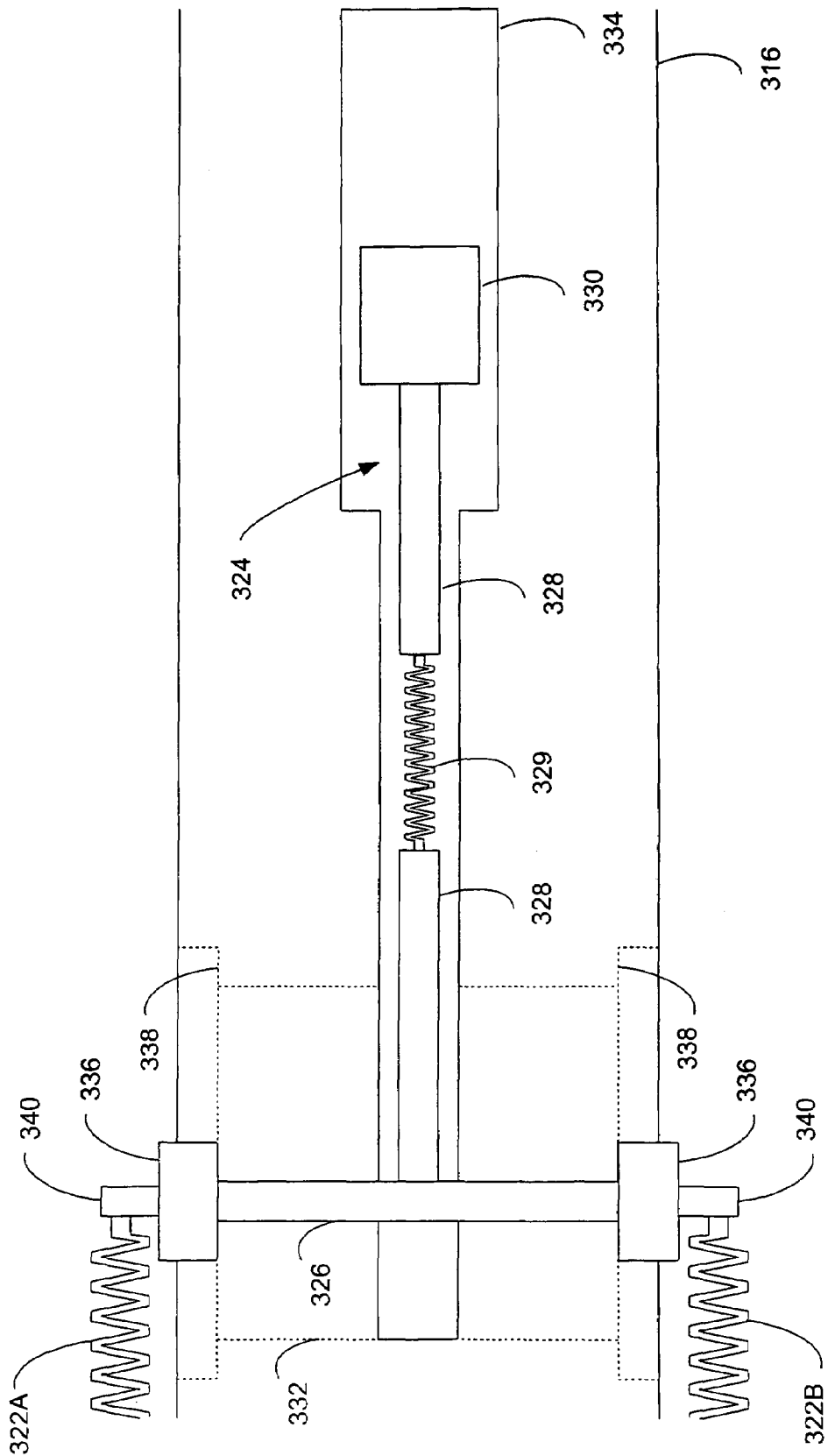
FIG. 4 shows a top cross section of a spring from FIG. 3 providing additional detail.

Referring to FIG. 4 there is shown a detailed side view 400 of the pendulum formed of mass 324. In order for the flexible rod 328 and pendulum mass 330 to oscillate freely, a pass through cut 334 exists in spring 316. Flexible rod 328 includes means for flexing. A stiff helical spring 329 longitudinally bisecting rod 328 is shown providing this flexibility. However, other flexible means can be envisioned by one skilled in the art. Guide-joint 326 of FIG. 3 includes guides 336, for complementing channels 338, in order that the guide remain properly oriented in slot 332. Further, the guide-joint 326 has connectors 340 that are connected to symmetrical springs 322*a* and 322*b*. These springs in combination serve the function of spring 322 of FIG. 3.

Figure 5:
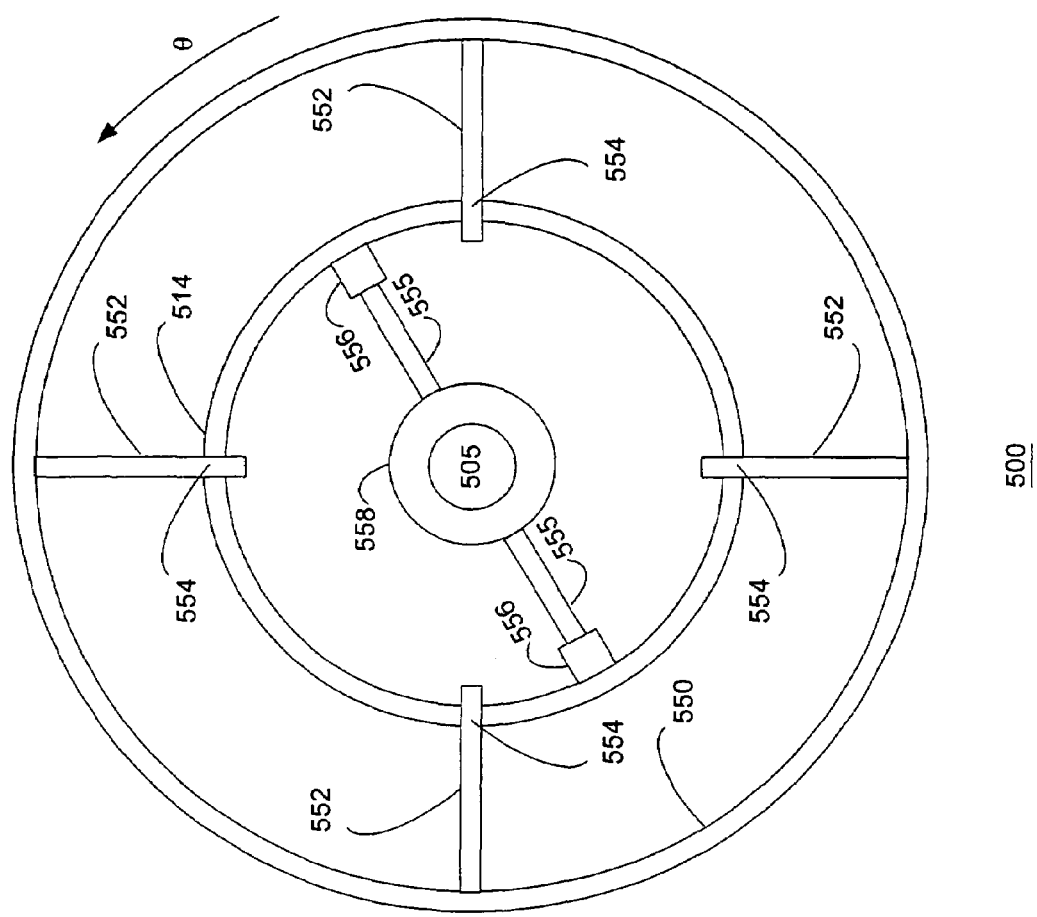
FIG. 5 shows an end view of the shaft of FIG. 1 with another embodiment of the invention in part (not all masses and springs shown)
Figure 5A:
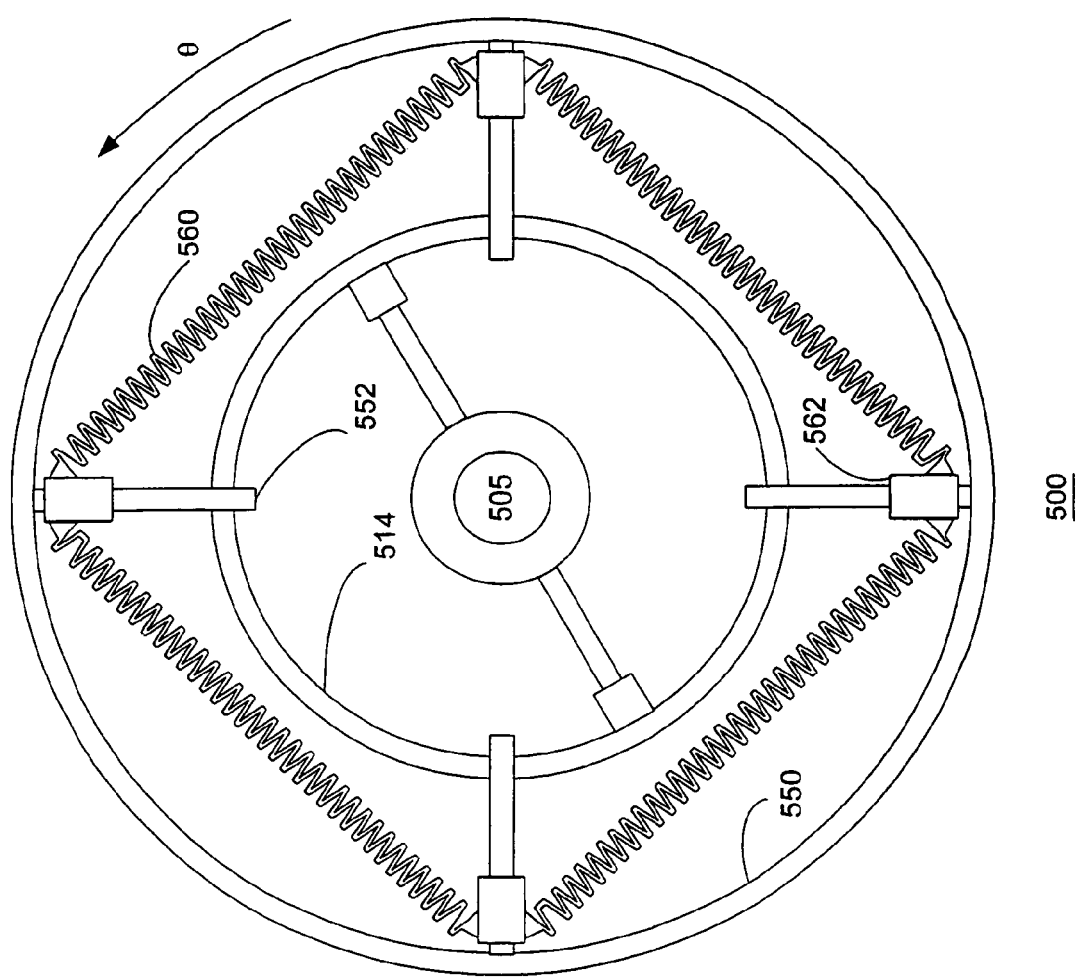
FIG. 5A shows the end view of FIG. 5 with all masses and springs shown.

Referring to FIGS. 5 and 5A there is an end view of another embodiment of a damper 500 for dampening one undesired harmonic force. Hub 505 and outer ring 550 are co-centered, and rigidly fixed in relation to each other. The superstructure (not shown) that makes this connection may be sealed in order to ensure that the interior is protected from debris. Ring 514 is connected to the outer ring 550 by means of cantilever springs 552 coupled to ring 514 at cut through holes 554 in ring 514. These springs 552 are affixed to the outer ring 550, and generally extend toward the hub 505. In order that ring 514 remain centered, struts 555 couple ring 514 to hub 505. Struts 555 extend outward from hub 505. However, because ring 514 is free to oscillate under the governance of the cantilever springs 552, struts 555 include rollers 556 at the coupling of ring 514 or, alternatively, an outer hub 558 coupled to hub 505 by roller bearings (not shown). In order to tune the oscillation of ring 514, tuning masses 562 slide along each of the cantilevers 552. The masses 562 are governed by helical springs 560, coupling adjacent masses 562 around the hub 505. Alternatively (not shown) springs may connect masses 562 in a radial direction to the outer hub 550 and/or the ring 514. Any of these arrangements generate the same type of tuning as spring-masses 220 and 218 or 322 and 324 i.e. movement of a selector (masses 562) along a first degree of freedom, alters a spring constant (or constants) of proportionality resulting in a change in the resonant frequency of a simple harmonic oscillator along a second degree of freedom. In this damper 500, unlike the previous arrangements, the mass 514 moving in the second, tuned, degree of freedom, is different than the selector (masses 562) moving in the first degree of freedom. However, either choice is within the scope of invention.

Figure 6:
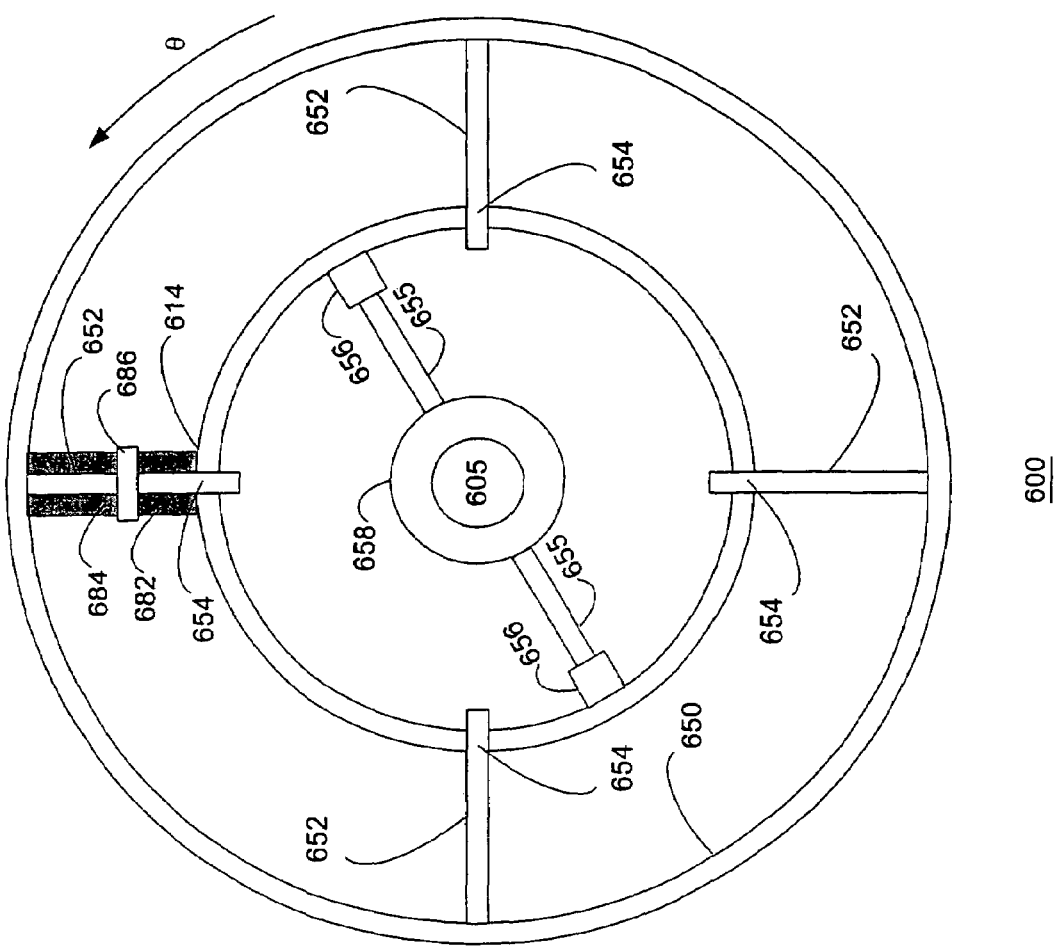
FIG. 6 shows an end view of the shaft of FIG. 1 with yet another embodiment of the invention.

Referring to FIG. 6, there is shown an end view of yet another embodiment of a damper 600 for dampening one undesired harmonic force.

Elements of this embodiment 605, 614, 650, 652, 654, 655, 656, 658, correspond to elements 505, 514, 550, 552, 554, 555, 556, 558, of damper 500 discussed above. Damper 600 differs from damper 500, however, in the springs 682, 684 and mass 686 shown on one cantilever spring 652. These three elements form an additional contour operating as per the spring-mass 218-220 combination of embodiment 200. The use of two springs of this oscillating contour allows a greater selection and range of stiffness of the overall spring effect.

Alternatively, mass 686 may be disposed without a cantilever spring and one or both of the springs 682, 684 may be two stiffness springs, having different stiffnesses with respect to radial and angular motion.

Figure 7:
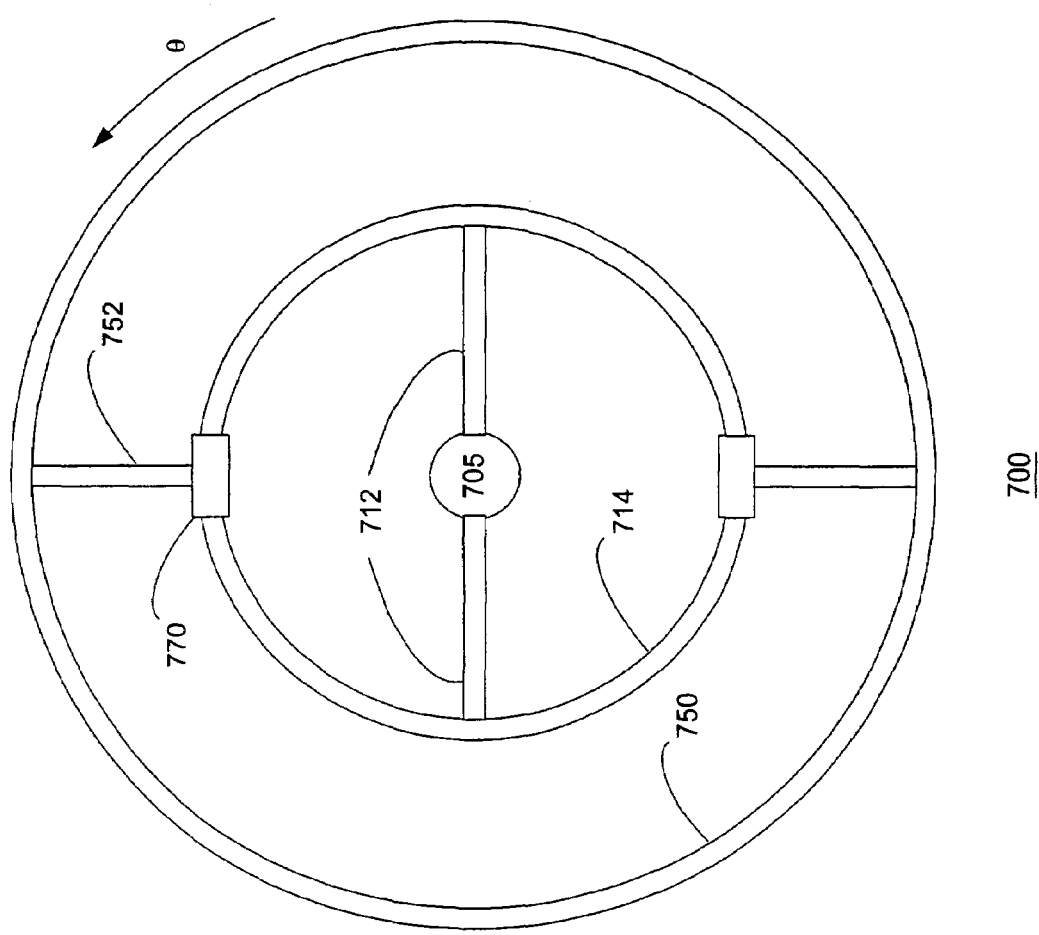
FIG. 7 shows an end view of the shaft of FIG. 1 with still another embodiment of the invention.

Referring to FIG. 7, an arrangement 700 is shown for a self-tuning dual mass wherein the self-tuning is the result of electromagnetic feedback. As with the hub 505 and outer ring 550 of FIG. 5, there is a hub 705 rigidly affixed to an outer ring 750. An inner ring 714 is co-centered with the hub 705 and connected by radial cantilever springs 712. The outer ring is connected to cantilever springs 752. These springs 752 are directed radially inward toward the inner ring 714 and terminate in sheaths 770 that surround an arc of the ring 714 (like two inter-linked annuli). Where the sheaths 770 and ring 714 have an applied current, an electromagnetic bond is established between them. Where the currents are varied, the degree of coupling is adjusted, thus providing for variance in spring forces (springs 712 plus some proportion of springs 752) that effect oscillation of ring 712 about the hub 704.

Figure 8:
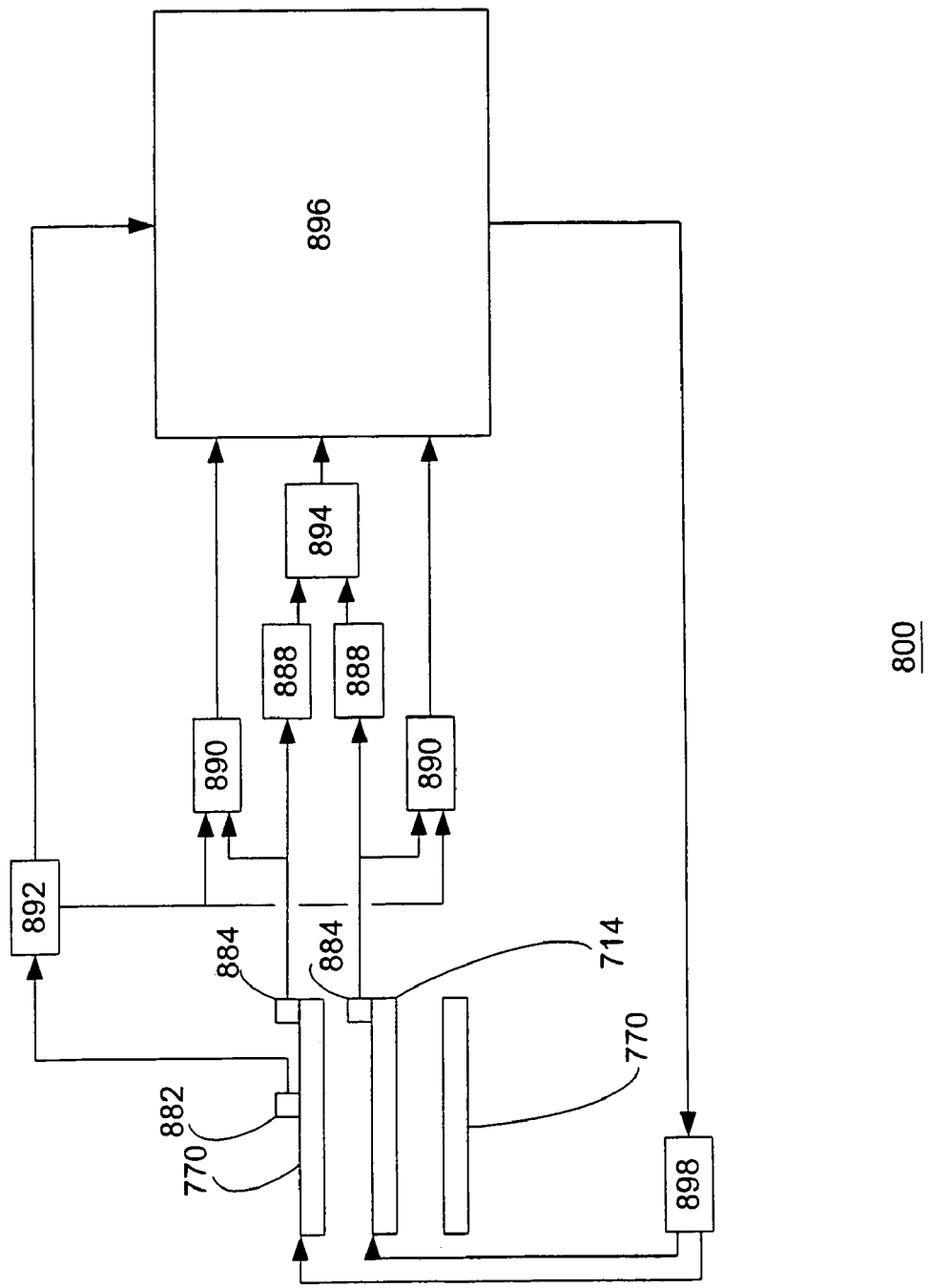
FIG. 8 shows a schematic diagram of one electromagnetic apparatus for co-operating with the embodiment of FIG. 7.

FIG. 8 shows the electromagnetic apparatus 800 for providing feedback to arrangement 700. Accelerometers 884 are connected to each of the inner ring 714 and the sheath 770 (shown in cross section). The accelerometers 884 are each connected to integrators 890. Both outputs of Integrator 890 are connected to computing system 896. The accelerometers 884 are also connected to phase detectors 888 that are, in turn, connected to one phase discriminator 894. This is, in turn, connected to the computing system 896. Also connected to the sheath is a frequency detector 882 that is connected, via filter 892, to the integrators 890 and the computing system 896. Amplifiers and filters may be used, where appropriate to ensure proper signal transmission. The computing system is connected to a current generator 898, which is connected to the inner ring 714 and sheath 770. The computing system 896 has the capacity to (i) input frequency, amplitude and phase difference data, (ii) perform algorithms on this data, and (iii) generate command signals for current generators.

The computing system 896 accommodates the following algorithms, either of which provides for self-tuning:

In a first algorithm, (i) when the sheath oscillation amplitude is greater in one interval, than the previous interval, and the inner ring amplitude is less than the amplitude of the previous interval (phase is not equal to 90 degrees), the frequency must be reduced; (ii) when the sheath oscillation amplitude is less than, in one interval, the amplitude in the previous interval, and the inner ring amplitude is greater than the amplitude of the previous interval (phase is not equal to 90 degrees), the frequency must be increased; (iii) when the amplitudes are constant from one interval to the next (phase equals 90 degrees), the frequency remains constant.

Frequency change is accomplished by changing the current. When frequency f is incremented by Δf, current j is incremented by $$\Delta j \propto \sqrt{(\Delta f(2f + \Delta f))} \quad (9)$$

and when frequency f is decremented by Δf, current j is decremented by $$\Delta j \propto \sqrt{(\Delta f(2f - \Delta f))}. \quad (10)$$

In a second algorithm, (i) when the sheath oscillation amplitude in one interval is not equal to amplitude in previous interval the inner ring amplitude must be incremented simultaneously with (i)(a) a reduction of frequency if the sheath oscillation amplitude is greater in one interval, than the previous interval; or (i)(b) an increase of frequency if the sheath oscillation amplitude is less in one interval, than the previous interval; (ii) when the sheath amplitude is constant from one interval to the next, the frequency remains constant. Frequency changes are implemented as in the first algorithm. Subsequent to frequency adjustment the inner ring 714 current amplitude is incremented unless the phase is equal to 90 degrees.

In a third algorithm, when the sheath oscillation amplitude is not equal to zero in one interval, an additional harmonic force is generated with frequency equal to frequency of actual external force, and phase equal to −90° (−π/2). The amplitude of this force leads the sheath oscillation amplitude to a zero value.

Figure 9:
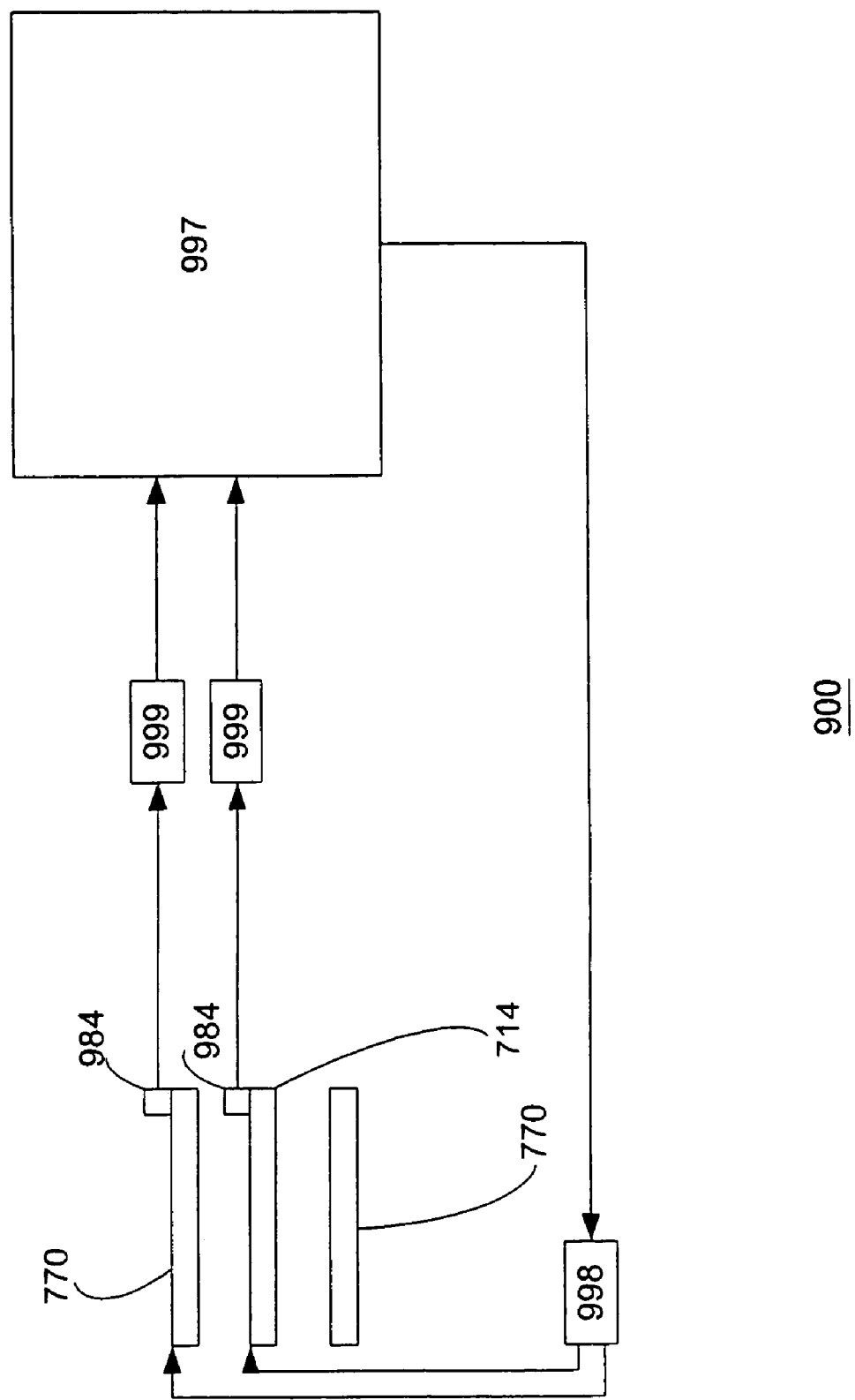
FIG. 9 shows a schematic diagram of an alternative electromagnetic apparatus for co-operating with the embodiment of FIG. 7.

Referring to FIG. 9, there is shown an alternative electromagnetic apparatus 900 for providing feedback to arrangement 700. Accelerometers 984 are connected to each of the inner ring 714 and the sheath 770 (shown in cross section). The accelerometers 984 are each connected to spectrum analyzers 999 (e.g. Fourier analyzers), which are, in turn, connected to computing system 997. The computing system is connected to a current generator 998, which is connected to the inner ring 714 and sheath 770. Amplifiers and filters may be used, where appropriate, to ensure proper signal transmission. The computing system 997 has the capacity to (i) rank and filter input spectra to select undesired harmonics, (ii) generate corresponding frequency and amplitude signals, (iii) determine phase difference between sheath and inner ring harmonics, (iv) perform algorithms on phase, frequency and amplitude data, and (v) generate multi channel command signals for current generators.

The aforementioned three algorithms for computing system 896, are also applicable to step (iv) for computing system 997, with one modification. Apparatus 900 has the capacity to analyze and respond to multiple undesired harmonic frequencies, and therefore the algorithms can be modified to operate for each of these harmonics independently. This results in multiple channels for current generation.

For both apparatus and all algorithms, however, the operating principle is the same: Firstly, the mass of inner ring 714 is oscillating under springs 712 and springs 752, where spring 752 is coupled to ring 714 by electromagnetic forces due to applied current(s). This oscillation dampens torsional vibrations of shaft 705. Secondly, motion-to-signal transducers (e.g. accelerometers) identify undesired harmonic motion, in inner ring 714 relative to sheath 770. Thirdly, calculations are made on transducer output in order to determine an output that will yield a corresponding dampening spring stiffness improvement i.e. those applied current changes that, as a result of a change of total effective spring constant (for oscillation), improve dampening of the detected undesired harmonic motion. Finally, those current changes are applied (feedback). The electromagnetic feedback solutions described herein amount to controlled passive, semi-active and active rather than passive elements of the overall mechanical system, whereas the spring-mass systems described previously are passive elements.

Note that the various dampers disclosed herein are not mutually exclusive, and various permutations can be envisioned by one with ordinary skill in the art, to address situations where a shaft has many undesired torsional vibrations. A comprehensive example of such a permutation is the combination of a number of tuned spring-mass-cantilevers of FIG. 2, with a number of pendulums arranged as per FIG. 3, and including a number of electromagnetically coupled rings as per FIG. 7 with integral spectral analysis. Using spectral analysis alone there is no theoretical limit to the number of harmonics that can be addressed. However, it is believed to be more economical to address major harmonics with passive dampening as per FIGS. 2 or 3.

While the present invention has been described in detail for purposes of implementation, the above-described embodiments of the invention are merely examples. Alterations and modifications may be effected thereto, by those of skill in the art, without departing from the scope of the invention which is defined solely by the claims appended hereto.

What is claimed is:

1. A damper for mitigating torsional vibrations of a shaft rotating with an angular velocity, said damper comprising:
   a generally circular ring surrounding said shaft and rotatable therewith; and
   at least two generally diametrically opposite spring and mass arrangements, each of said spring and mass arrangements comprising:
      a first spring coupled at one end to said ring and being radially inwardly oriented toward said shaft; and
      a mass coupled to said shaft via a second radially oriented spring, said mass oscillating in a direction generally perpendicular to the axes of said first and second springs,
   wherein oscillation of said masses dampens torsional vibrations of said shaft corresponding to a frequency of said oscillation, the mass of each spring and mass arrangement being moveable radially along the first spring of the same spring and mass arrangement in response to changes in the angular velocity of said shaft thereby to adjust the spring constant of that first spring.

2. The damper of claim 1 wherein said frequency is a constant multiple of said angular velocity.

3. The damper of claim 2 wherein said frequency is a constant multiple of said angular velocity by a natural number.

4. The damper of claim 1 further comprising a pair of additional springs, each additional spring being radially oriented and coupling said ring to said shaft, said additional springs extending in generally opposite radial directions, the radial directions of said additional springs being perpendicular to the radial directions of said spring and mass arrangements.

5. The damper of claim 4 further comprising a hub secured to said shaft, said spring and mass arrangements and said additional springs being affixed to said hub.

6. The damper of claim 4 wherein said frequency is a constant multiple of said angular velocity.

7. The damper of claim 1 further comprising a hub secured to said shaft, said spring and mass arrangements being affixed to said hub.

8. The damper of claim 7 wherein said frequency is a constant multiple of said angular velocity.

9. A damper for ameliorating torsional vibrations of a shaft rotating with an angular velocity, said damper comprising:
   a ring-like element surrounding said shaft and rotatable therewith; and
   at least two damping arrangements oriented in generally opposite radial directions and coupling said ring-like element to said shaft, each said damping arrangement comprising:
      a mass;
      a radially inwardly oriented first spring element coupled to said ring-like element; and
      a radially oriented second spring element coupled to said mass and to said shaft, the mass of each damping arrangement oscillating in a direction perpendicular to the radial direction of said damping arrangement thereby to dampen torsional vibration of said shaft, the mass of each damping arrangement being moveable radially along the first spring element of the same damping arrangement in response to velocity changes of said shaft to change the effective length of that first spring element and thereby adjust its spring constant.

10. The damper of claim 9 further comprising a pair of additional spring elements, each additional spring element being radially oriented and coupling said ring-like member to said shaft, said additional spring elements extending in generally opposite radial directions, the radial directions of said additional spring elements being perpendicular to the radial directions of said damping arrangements.

11. The damper of claim 10 wherein said ring-like element is a circular ring concentric with said shaft.

12. The damper of claim 11 further comprising a hub secured to said shaft, said damping arrangements and said additional spring elements being affixed to said hub.

13. The damper of claim 9 wherein said ring-like element is a circular ring concentric with said shaft.

14. The damper of claim 13 further comprising a hub secured to said shaft, said damping arrangements being affixed to said hub.

15. The damper of claim 9 wherein each damping arrangement further comprises an additional mass moveably mounted on said first spring element.

16. The damper of claim 15 wherein said additional mass is coupled to said mass via a third spring element.

17. The damper of claim 16 wherein said additional mass is rotatably coupled to said first spring element.

18. The damper of claim 15 further comprising a pair of additional spring elements, each additional spring element being radially oriented and coupling said ring-like member to said shaft, said additional spring elements extending in generally opposite radial directions, the radial directions of said additional spring elements being perpendicular to the radial directions of said damping arrangements.

19. The damper of claim 18 wherein said ring-like element is a circular ring concentric with said shaft.

20. The damper of claim 19 further comprising a hub secured to said shaft, said damping arrangements and said additional spring elements being affixed to said hub.

* * * * *